May 7, 1940.  T. P. CAMP ET AL  2,200,155
MANUFACTURE OF WALLBOARD HAVING A CEMENTITIOUS CORE
Filed Nov. 21, 1936
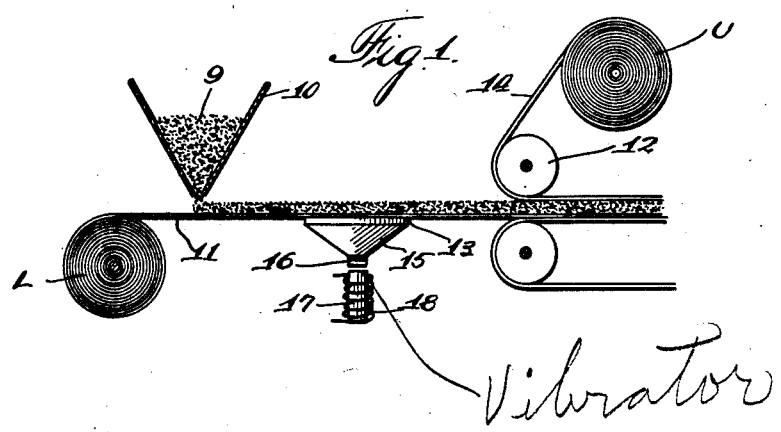
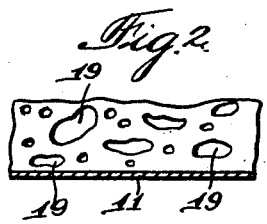
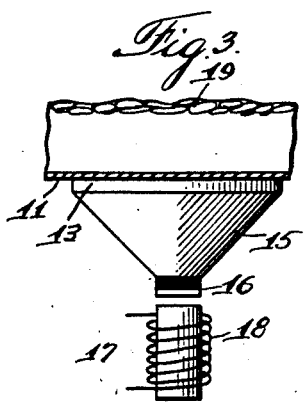
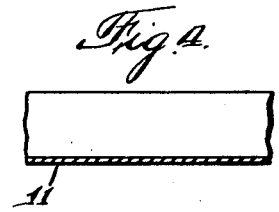
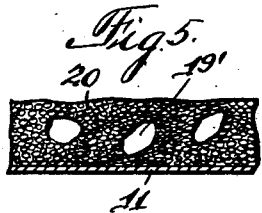
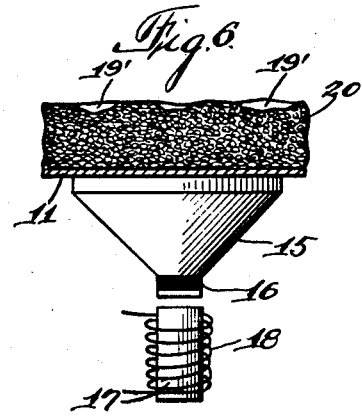
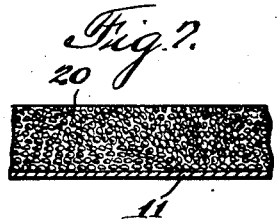
Inventors
Thomas P. Camp
& John Page
By Amss, Thies, Olsen & Mecklenburger
Attys Patented May 7, 1940

2,200,155

UNITED STATES PATENT OFFICE 2,200,155

MANUFACTURE OF WALLBOARD HAVING A CEMENTITIOUS CORE

Thomas P. Camp, Glen Ellyn, and John Page, Evanston, Ill., assignors to United States Gypsum Company, Chicago, Ill., a corporation of Illinois Application November 21, 1936, Serial No. 112,054

9 Claims. (Cl. 154—2)

The present invention relates to improvements in the manufacture of wallboard, and the like, in which a cementitious core is employed, covered by means of a fabric layer, as, for example, heavy paper or cardboard.

One of the objects of the invention is to avoid the presence in the board of undesired large voids or bubbles, or, when artificial voids are intentionally formed in the core, to control their size and to eliminate any that are larger than a selected size.

This is accomplished by subjecting the plastic material that forms the core of the board, prior to its being placed between the cover sheets or liners, to vibratory action, so as to cause any bubbles or voids therein contained, that are of greater than the desired size, to be forced to rise to the surface of the plastic mass, where they break and hence are eliminated from the plastic material.

In the drawing forming a part of the present disclosure, the process and product are diagrammatically illustrated in only sufficient detail to enable the proper understanding of the invention and without any attempt to show any of the parts or articles to scale.

In the drawing:

Figure 1 is a diagrammatic side view of a small portion of a machine for making a board having a cementitious core, showing only such parts as are necessary for an understanding of the invention.

Figs. 2 through 7 are small, fragmentary, vertical sections of the product at various stages in its formation.

The invention is mainly directed to the making of wallboard having a gypsum core but is not limited thereto, as other rapidly setting cements may be employed to produce similar products.

Basically, gypsum board is made by depositing a plastic mixture of plaster of Paris, with or without modifying reagents, on a fibrous paper liner and spreading the plastic mixture to a uniform thickness and width by means of a roll, with the simultaneous application of the upper fibrous liner. Since gypsum wallboard is rather unwieldy and heavy, various means have been used to lighten its weight and thus increase its use. Among the more successful ways of decreasing the weight is to use an aerated or cellular core in the board. Some produce it by mixing with the dry plaster of Paris certain gas-producing reagents, such as calcium carbonate and aluminum sulfate, which on the addition of water to render the mix sufficiently plastic will react, with concomitant liberation of carbon dioxide gas. This gas is entrapped in the plastic mix, which, when set and hard, will then have a cellular structure. Others, again, employ peroxides of an inorganic nature that on the addition of water decompose with the liberation of oxygen gas.

Among the many schemes for the production of cellular core, the foam method is particularly effective. By this method a preformed, tenacious, and stable foam is blended with plaster of Paris or any other cementitious plastic mix, with or without modifying materials, which on setting and hardening will thus have a cellular structure.

Two of the more important essentials to wallboard quality are good bond and core. Good bond between the fibrous liner and a cellular core is predicated upon the existence of a core possessing uniformly sized and relatively small cells that are evenly distributed throughout the mass and freedom from any defects at the interface between the liners and core. It is obvious that relatively large sized voids, which approach the thickness of the board, are undesirable, since the section of the core containing the void not only then possesses insufficient crushing strength but also may lack continuity of adhesive contact between the core body and the liners. It is, therefore, essential that good core be uniform as to size of the bubbles and their distribution within its matrix.

The processes employed for producing cellular gypsum products do not always yield uniformly sized bubbles or uniform distribution thereof throughout the plastic mass. For instance, when the calcium carbonate and aluminum sulfate are not premixed thoroughly and dispersed uniformly throughout the plaster of Paris, the voids in the core are of various sizes. In addition, the temperature rise caused by the heat of wetting and reaction has a marked effect on the size of the cells, whose gaseous contents expand directly under its influence. The larger sized bubbles, because of their buoyancy, will have a tendency to rise through the plastic mass to the surface, which, when set and covered by a paper liner, will be susceptible to crushing. The bottom side, where the smaller and more uniformly sized bubbles because of decreased buoyancy are entrapped by the set plaster, will tend to be stronger. Again, the large sized bubbles on the surface of the core give comparatively large areas where little or no contact exists between the core and the liner. These areas have no bond and are referred to frequently as blisters.

Better results are obtained when a stable foam is added to the plastic mix. The foam is generally made by briskly beating solutions of a foaming agent, with or without a reinforcing medium, such as a modified starch, glue, gelatin, casein, Karaya gum, etc. The foam as prepared is fairly uniform in bubble size and can be controlled to a large degree. However, at times, and particularly when the foam is added directly to the mixture of plaster of Paris, water, and other ingredients entering into the composition of the core, large voids are formed by the action of the mixer. In addition, these voids may also be formed by air entrapped by the mix as it falls to the bottom paper before passage through the master roll.

The bubble cell wall consists of a solution of a foaming agent and possibly reinforcing agents such as modified starch or other materials. Though the bubble cell wall is strong, we have found that the larger sized bubbles, upon reaching the surface of the plastic mix, collapse easily when exposed to relatively slight shocks, such as those induced by a vibrating means.

Therefore, it is the object of this invention to provide a method and means for producing a uniformly sized and evenly distributed cell structure for wallboard use.

A further object of this invention is to provide necessary means to effectuate the process of removing from the interior to the surface of the plastic mix large sized bubbles and destroying the said bubbles on the surface by means of vibrating means.

These and other objects, uses, advantages, and various adaptations of our invention will become apparent to those skilled in the art.

The following is a detailed description of our invention:

Referring to Figure 1 of the drawing, there is therein shown a small portion of the equipment used in the production of a gypsum wallboard. The proper amounts of plaster of Paris and other dry ingredients, water and, if desired, previously prepared stable foam are blended to produce a plastic mass. This mass 9 is deposited, as for example from hopper 10, on the lower paper liner 11 for conveyance to the master roll 12. About two or three feet ahead of the master roll, a vibrating plate 13 acts on the plastic mass as it is conveyed forward. The master roll spreads the plastic mass to a uniform thickness and, at the same time, superimposes the upper liner 14 to form a continuous sheet. The mass then sets and hardens while being conveyed from the master roll, and is finally cut to the desired size for passage through the drier. The supply of paper for forming the lower and upper liners for the board are indicated by the circles marked L and U, respectively.

We have found that by placing a vibrating plate 13, actuated by any suitable means, under the bottom paper, before the master roll, the large sized bubbles will emerge and break on the surface of the plastic mass. As illustrated diagrammatically, we have shown the plate 13 as being supported by a suitable support 15, terminating in an armature 16 which is under the influence of an electromagnet consisting of the coil 17 and core 18. Such a vibrator is a well known article of commerce.

The plastic mass 9 containing the large voids created by the blending action, or present in the foam, is conveyed over the vibrating plate 13, which not only spreads the flowing plastic mass, and thereby allows of the detection and removal of any lumpy material, but also decreases its depth and thereby facilitates the escape of large bubbles to the surface. In addition, it destroys the large bubbles on the surface of the plastic mix and thus prevents their entrapment by the upper liner of the wallboard.

Foam prepared for addition to cementitious mixes must be sufficiently stable to withstand the violent blending and churning action of the mixer vanes. It has been found that such foam, if allowed to remain substantially undisturbed, will retain its body and maintain its cellularity for a number of hours. In the old method for producing cellular wallboard, some of the foam would always tend to rise to the surface. Since it was not destroyed or otherwise removed it would be entrapped between the upper liner and the core and form air pockets. In turn, the air pockets would interfere with the contact of the core with the liner and hence give rise to blisters. In our invention, the large bubbles are removed before they can be entrapped and a continuous contact is assured between the liner and the core, to form an excellent bond.

The liberation and collapse of bubbles will occur within the relatively short time of about thirty seconds. However, the time that it takes such bubbles to be removed and destroyed depends greatly not only on the frequency, amplitude and strength of the vibration but also on the effect of cell wall reinforcing agents, viscosity of the plastic mix, and atmospheric conditions. In using our process, we prefer to submit the plastic mix to the effect of vibrating force for approximately thirty seconds, but we do not wish to limit ourselves to this particular time, since obviously it can be varied within wide limits. Any means of vibration can be employed, and the vibration can be driven mechanically or electrically, although we prefer to use a magnetic vibrating device because of simplicity. Others can be used with equally effective results.

As already indicated, the invention is by no means limited to the production of wallboard having a cellular core but may be employed with equal success for the manufacture of a solid gypsum core or one having various weight-reducing aggregates admixed therewith. The plastic material, in falling from the hopper 10 to the lower paper liner 11, often entraps considerable amounts of air, forming large voids which, unless they are removed from the plastic mass, will cause voids or blisters in the core of the product. Also, if, as is often the case in the manufacture of cellular core wallboard, the calcined gypsum or plaster of Paris is first mixed with water and then with a pre-made foam, the mixing fingers or agitators that effect the final blending of the mass also tend to cause large voids to form, either by physical entrapment of air or by the mechanical breaking of some of the foam bubbles, so that larger bubbles than those of the selected size will be formed in the mass. It also happens that the foam tends to coalesce into larger bubbles, which it is desired to eliminate. In all such cases the vibration imparted to the plastic mass before it encounters the upper liner and the master roll will cause these larger bubbles to rise to the surface of the mass and there to break and become dissipated.

It has also been found desirable to add to the plaster of Paris or calcined gypsum certain thickening agents, such as starch, starch paste, flour, water-soluble or swellable gums, etc. to increase the viscosity of the mixture. Such mixtures are very prone to cause entrapment of relatively large air bubbles, which also can be eliminated by the practice of the present invention.

Referring to Figs. 2, 3 and 4, these represent diagrammatically (not to scale) the internal structure of the mass of plastic materials before (Fig. 2), during (Fig. 3) and after (Fig. 4) having passed over the vibrating plate 13. Thus in Fig. 2 the voids 19 are shown as being heterogeneously distributed through the plastic mass reposing on the paper liner 11. In Fig. 3 these voids 19 are shown at the surface of the mass, just about ready to break. In Fig. 4 these voids are no longer present, and the mass is substantially free from internal spaces. These three figures refer to plastic mixtures in which no gaseous weight-reducing aggregate has been employed.

Figs. 5, 6 and 7 are similar to Figs. 2, 3 and 4 but show the effect of the vibration on a plastic mix to which gaseous weight-reducing agents have been added. Thus in Fig. 5 it will be seen that the plastic mass is permeated with a large number of small bubbles or voids 20, although there are also present larger voids 19'. The purpose of the present invention is to eliminate these larger voids 19', while retaining the smaller, desirable voids 20 of the selected size. Obviously, some of the bubbles may be slightly smaller than others, and hence the term "of selected and less than selected size" in the claims of this application is intended to differentiate from the larger voids or spaces 19' which are of greater than the selected size. In Fig. 6 these larger than selected voids 19' are shown just about ready to break, or actually breaking, on the surface of the plastic mix, while Fig. 7 illustrates, diagrammatically of course, the appearance and structure of the mixture after it has been sufficiently vibrated to eliminate the undesired larger voids 19', leaving the desired voids 20 of selected and less than selected size.

In conclusion we wish to state that while the examples described constitute practical embodiments of our invention, we do not confine ourselves specifically to those details, since obviously the same may be varied without departing from the spirit of this invention as defined in the appended claims.

Having described our invention, we claim as new and desire to secure by Letters Patent:

1. The process of manufacturing a wallboard having a cementitious core which comprises spreading a slurry of cementitious material and water upon a forwardly-moving sheet of fabric, thereby producing thereon a layer of unset cementitious material in which undesired entrapped air bubbles exist, vibrating the thus placed mass to remove said entrapped bubbles therefrom, then applying an upper sheet of fabric to the thus produced mass of air-freed material, shaping the mass to size between said sheets of fabric, and allowing it to set.

2. The process of manufacturing a wallboard having a set gypsum core which comprises spreading a slurry of calcined gypsum and water upon a forwardly-moving paper sheet, thereby producing thereon a layer of unset gypsum in which undesired entrapped air bubbles exist, vibrating the slurry while on the sheet and in forward motion to remove said bubbles therefrom, and then applying thereto a cover sheet of paper, shaping the slurry to size between the sheets, and permitting the slurry to set.

3. The process of manufacturing a wallboard having a set gypsum core which comprises spreading a slurry of calcined gypsum and water upon a forwardly-moving web of paper, vibrating the slurry while moving forward on and with the paper from beneath, applying a cover sheet of paper to said vibrated slurry, and allowing the gypsum to set.

4. The process of manufacturing a cellular gypsum board having paper liners which comprises the steps of mixing calcined gypsum, water and foam to form a cellular slurry containing gaseous bubbles of selected, less than selected and greater than selected size, depositing said slurry upon a forwardly-moving web of fabric, vibrating the slurry from beneath the fabric to cause the elimination from the slurry of the bubbles of greater than the selected size, applying an upper web of fabric to the slurry, shaping the slurry to form a substantially flat core between the thus applied fabric webs, and allowing it to set.

5. The process for controlling the size of gaseous voids in a cementitious slurry capable of being hardened, which comprises the steps of producing gaseous voids therein, said voids varying in size, some being larger and some smaller than the desired and selected size, and vibrating the slurry to cause the larger than selected voids to rise upwardly in the slurry, thereby causing them to travel to the surface thereof, where they break and hence are eliminated, leaving the voids of selected and less than selected size in the slurry to render the same cellular.

6. The process for controlling the size of gaseous voids in a slurry of cementitious material and water which comprises the steps of forming therein voids of a selected, less than selected, and greater than selected size, and vibrating said slurry from beneath to cause the elimination therefrom, by rising and bursting at the surface, of the voids that are larger than the selected size.

7. The process of sorting gaseous foam-like voids in a cementitious slurry to eliminate therefrom voids of greater than a selected size, which comprises vibrating the slurry to cause the larger voids to rise to the surface of the slurry, where they may break.

8. The process of producing a gypsum wallboard devoid of large and objectionable internal voids, and further characterized by a strong and substantially uniform bond between the gypsum core and the paper liners adhering thereto, which comprises mixing calcined gypsum with water and a density-reducing agent, depositing the resulting slurry upon a forwardly-moving web of thick paper, vibrating the paper and the slurry reposing thereon for a period to remove large air-voids therefrom, then applying an upper web of thick paper to the slurry while simultaneously causing the slurry to spread evenly between the applied webs of paper to form a substantially uniform core therebetween, and allowing the core to set.

9. The process of producing a gypsum wallboard devoid of large and objectionable internal voids, and further characterized by a strong and substantially uniform bond between the gypsum core and the paper liners adhering thereto, which comprises mixing calcined gypsum with water, depositing the resulting slurry upon a forwardly-moving web of thick paper, vibrating the paper and the slurry reposing thereon for a period to remove entrapped large air-voids therefrom, then applying an upper web of thick paper to the slurry while simultaneously causing the slurry to spread evenly between the applied webs of paper to form a substantially uniform core therebetween, and allowing the core to set.

THOMAS P. CAMP.
JOHN PAGE.